United States Patent
Kuo

(10) Patent No.: US 8,407,753 B2
(45) Date of Patent: Mar. 26, 2013

(54) CONTENT LIST TAILORING FOR CAPABILITY OF IPTV DEVICE

(75) Inventor: Jenke Wu Kuo, San Diego, CA (US)

(73) Assignee: Sony Corporation, Tokyo (JP)

(*) Notice: Subject to any disclaimer, the term of this patent is extended or adjusted under 35 U.S.C. 154(b) by 504 days.

(21) Appl. No.: 12/797,825

(22) Filed: Jun. 10, 2010

(65) Prior Publication Data

US 2011/0307934 A1    Dec. 15, 2011

(51) Int. Cl.
*H04N 7/173* (2011.01)
*G06F 15/16* (2006.01)

(52) U.S. Cl. .......................... 725/116; 709/246

(58) Field of Classification Search ........................ None
See application file for complete search history.

(56) References Cited

U.S. PATENT DOCUMENTS

| 6,799,196 | B1 | 9/2004 | Smith | |
|---|---|---|---|---|
| 2007/0283048 | A1* | 12/2007 | Theimer et al. | 709/246 |
| 2008/0168132 | A1* | 7/2008 | Chun | 709/203 |
| 2009/0307307 | A1 | 12/2009 | Igarashi | |
| 2010/0100898 | A1 | 4/2010 | Pflefing et al. | |
| 2010/0138859 | A1* | 6/2010 | Ko | 725/37 |

FOREIGN PATENT DOCUMENTS

EP    1793292    9/2008

* cited by examiner

*Primary Examiner* — Kristine Kincaid
*Assistant Examiner* — Oschta Montoya
(74) *Attorney, Agent, or Firm* — John L. Rogitz

(57) ABSTRACT

An Internet Protocol TV (IPTV) manufacturer and/or IPTV device user may configure and upload the profile of the IPTV into an IPTV server. The IPTV server filters the playable contents delivered to the IPTV as necessary to match downloaded playlists and links with the IPTV profile.

17 Claims, 3 Drawing Sheets

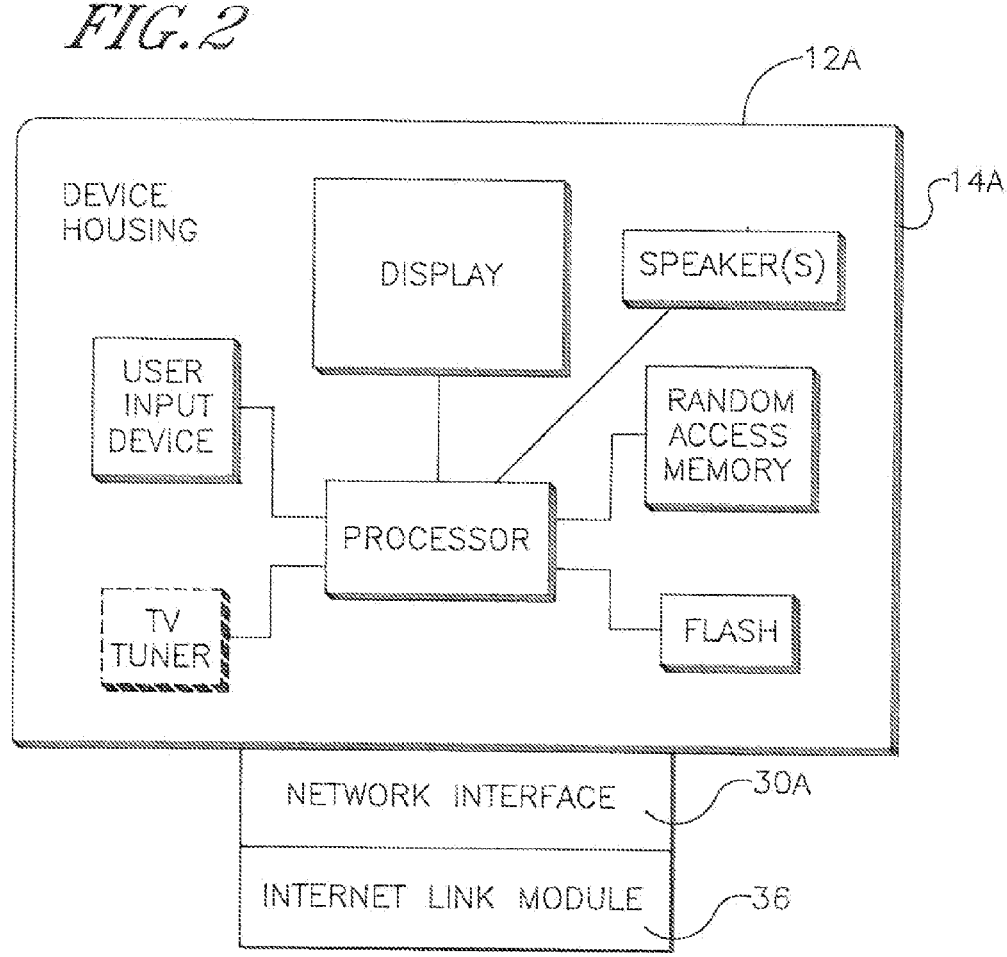
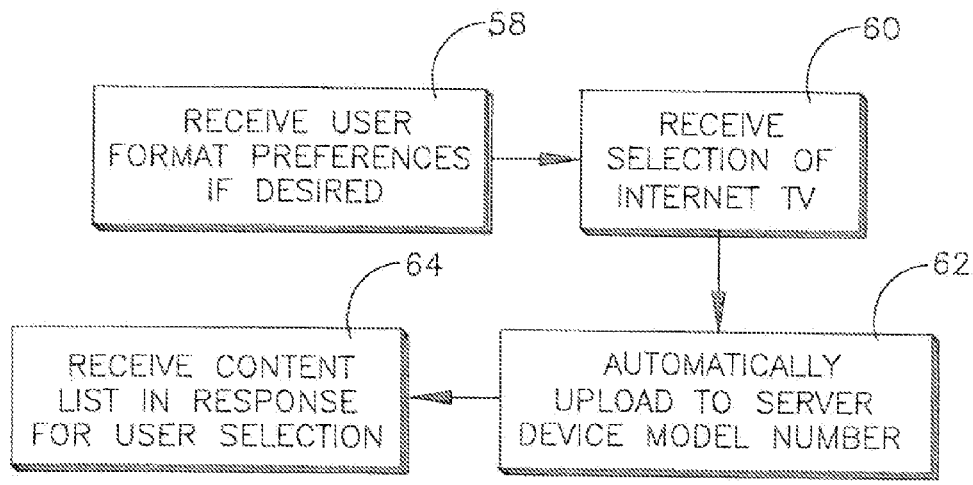

SERVER LOGIC

CONTENT LIST TAILORING FOR CAPABILITY OF IPTV DEVICE

FIELD OF THE INVENTION

The present application relates generally to content list tailoring for capabilities of IPTV devices.

BACKGROUND OF THE INVENTION

Internet access through TVs is typically provided by essentially programming the TV as though it were a computer executing a browser. Such Internet access is thus uncontrolled except as a firewall or filtering program might block certain sites.

As understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet.

As also understood herein, an IPTV server may have content that cannot be played by certain devices because of incompatibilities between the formatting of the content and the capabilities of the device.

SUMMARY OF THE INVENTION

Accordingly, a method includes using an Internet server including a processor and a tangible non-transitory computer readable storage medium for receiving a list of consumer electronic (CE) device model numbers from a manufacturer of CE devices. The model numbers are correlated with respective device capabilities. At the server, available content it hosts is classified by model number, such that the server correlates its content to one or more model numbers by matching characteristics of each piece of content with the capabilities of each model number. The server receives from a CE device its model number and responsive to the model number, downloads to the CE device a tailored list that is tailored for the capabilities of the model number of the CE device. Responsive to a request from the CE device for additional content that is not on the tailored list but that the server is capable of reformatting for the capabilities of the CE device, a list of such reformattable content is provided by the server to the CE device. A report is sent to the manufacturer of the CE device indicating which list(s) were downloaded to the CE device, including an original content list from a content server and subsequent reformattable content lists.

The model numbers can be of CE devices expected by the manufacturer to participate in a closed Internet Protocol TV (IPTV) system. The IPTV system is closed in that the IPTV system allows participating devices to obtain from a management server a list of a limited number of content servers from which to retrieve Internet-sourced TV content, with the content servers in turn providing content lists that are limited to pre-approved programming.

The logic executed by the server processor may also include receiving from the CE device user preferences, such that a particular model of CE device supporting two display formats permits a user to designate which format he prefers so that the server can download the preferred format. In example embodiments, the server is a management server providing to CE devices a list of content servers from which content may be downloaded, and the management server makes multiple copies of the content server list in respective differing formats so that a content server list can be provided to each of the model numbers which matches the capabilities of that model number. Thus, the management server downloads to the CE device, responsive to the model number, a list of content servers from which content may be obtained, with the list of content servers being tailored for the capabilities of the CE device. Further, suppose at least a first content server in the IPTV system cannot provide content matching the capabilities of the CE device. In this case, the list of content servers returned by the management server to the CE device does not include a link to the first content server but includes links to other content servers in the IPTV system which contain content matching the capabilities of the CE device.

Or, the server can be a content server which returns to the CE device over the Internet a content list showing only content matching the capabilities of the CE device such that a user of the CE device is able to select only content that is pre-filtered to be compatible with the capabilities of the CE device. If desired, along with the content list the content server may prompt the CE device that additional content not on the list is available for reformatting and provisioning to the CE device. The content server, responsive to a request from the CE device for a list of reformattable content, returns to the CE device the list of reformattable content from which a user can select a piece of content for reformatting and provisioning by the content server.

In some implementations the report can be used for remuneration. In some examples a relatively low bonus is paid for the downloading of a content list from a content server while a higher bonus is paid for the downloading of a piece of content from the content list. Further, if desired a bonus different from the relatively low bonus and higher bonus that may be higher than both can be paid for the downloading of a piece of content from the list of reformattable content list.

In another aspect, a consumer electronic (CE) device includes a housing, a display on the housing, a network interface, and a processor in the housing controlling the display and communicating with the Internet through the network interface. The processor executes logic including uploading to a server a model number of the CE device and receiving from the server a content list showing only content playable by the CE device based on the model number. A user can select an entry on the content list for downloading and playing on the CE device.

In another aspect, an IPTV content server has a processor communicating with the Internet and accessing a tangible non-transitory computer readable storage medium. The processor executes logic which includes classifying available content hosted by the server by CE device model numbers. The model numbers are correlated with respective device capabilities, such that the server correlates its content to one or more model numbers by matching characteristics of each piece of content with the capabilities of each model number. The logic includes receiving from a CE device its model number and responsive to the model number, downloading the CE device a content list that contains only multimedia content for play on the CE device that matches the capabilities of the CE device. A report is sent to a manufacturer of the CE device indicating which list(s) were downloaded to the CE device.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a block diagram of another example system in accordance with present principles;
FIG. 4 is a flow chart of example CE device logic.

DETAILED DESCRIPTION OF THE PREFERRED EMBODIMENT

Figure 1:
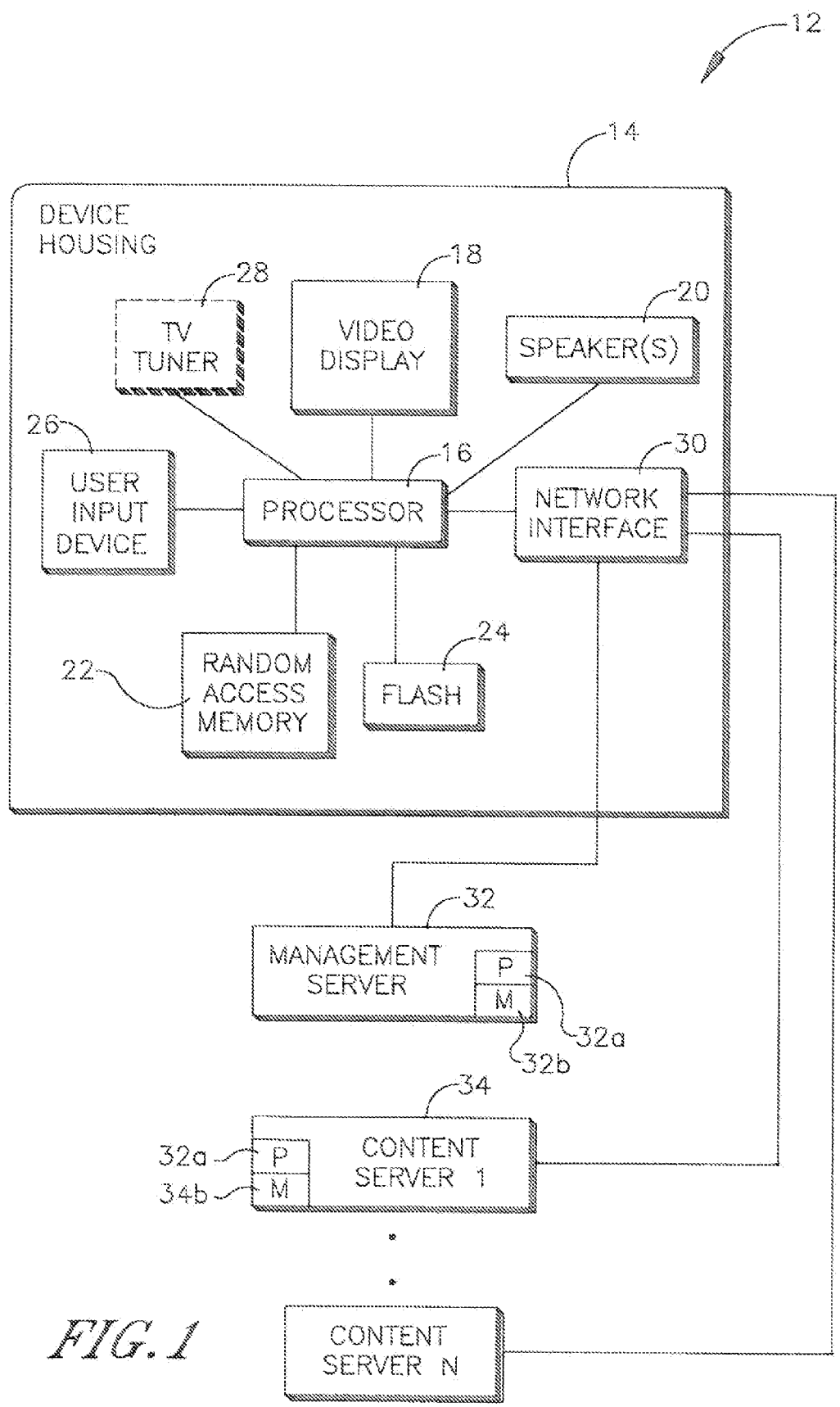
FIG. 1 is a block diagram of an example system in accordance with present principles.

Referring initially to FIG. 1, a consumer electronics (CE) device 12 (also referred to herein as "player" and "IPTV client") such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The processor 16 may access a media player module such that the CE device 12 has media decoding capability.

To undertake present principles, the processor 16 may access one or more computer readable storage media such as but not limited to RAM-based storage 22 (e.g., a chip implementing dynamic random access memory (DRAM)) or flash memory 24 or disk storage. Software code implementing present logic executable by the CE device 12 may be stored on one of the memories shown to undertake present principles.

The processor 16 can receive user input signals from various input devices 26, including a remote control device, a point and click device such as a mouse, a keypad, etc. A TV tuner 28 may be provided in some implementations particularly when the CE device is embodied by a TV to receive TV signals from a source such as a set-top box, satellite receiver, cable head end, terrestrial TV signal antenna, etc. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity to a management server 32 on the Internet and to one or more content servers 34. The servers 32, 34 have respective processors 32a, 34a and respective tangible non-transitory computer readable storage media 32b, 34b such as disk-based and/or solid state storage. It is to be understood in view of disclosure below that the CE device 12 particularly when implemented by a non-PC device such as a TV or game console or camera can communicate only with the management server 32 and with content servers 34 that appear on a service list provided to the processor 16 by the management server 32, with the service list not being modifiable by the processor 16.

FIG. 2, shows a CE device 12a that in all essential respects is identical to the device 12 shown in FIG. 1, except that a network interface 30a is not located within the device housing 14a but instead is supported in a separate Internet link module housing 36 that may be mounted on the device housing 14a.

Figure 3:
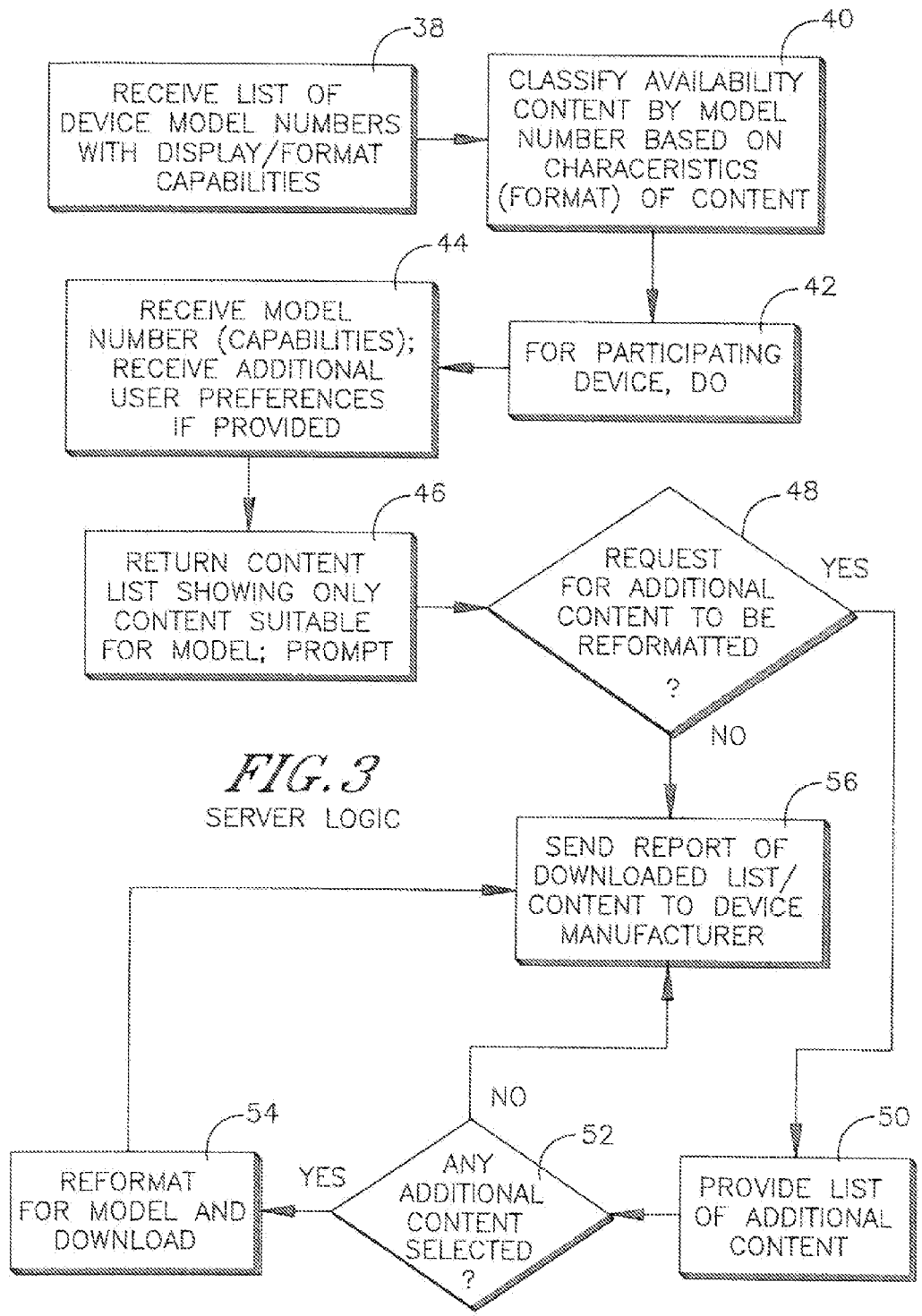
FIG. 3 is a flow chart of example server logic.

Now referring to FIG. 3, the logic that may be executed by one or both of the servers 32, 34 shown in FIG. 1 can be seen. Commencing at block 38 the server receives a list of CE device model numbers from the manufacturer of the CE device 12. The model numbers can be of devices expected by the manufacturer to participate in a closed IPTV service in that the IPTV service allows participating devices to obtain from the management server 32 a list of a limited number of content servers 34 from which to retrieve Internet-sourced TV content, with the content servers 34 in turn providing content lists that are limited to pre-approved programming. In any case, the model numbers are correlated with respective device capabilities and formats supported by the specific device model numbers.

Proceeding to block 40, the server classifies available content it hosts by model number. In other words, the server correlates its content to one or more model numbers received at block 38. The server may do this by matching the characteristics of each piece of content (e.g., its format) with the characteristics of each model number. In the case of the content server list provided by the management server 32, the management server 32 may make multiple copies of the content server list in respective differing formats so that a content server list can be provided to each of the model numbers which matches the capabilities of that model number.

Block 42 indicates that when a CE device 12 contacts the server, at block 44 the server receives from the CE device its model number, among other things. The server may receive additional user preferences as well, in implementations allowing for user input of preferences as explained further below. For example, a particular model of CE device may support two display formats, and the user may be permitted to designate which format he prefers so that the server can download the preferred format for a model number known to the server to support more than a single format.

Proceeding to block 46, the server, when it is the content server 34, returns to the CE device over the Internet a content list showing only content matching the capabilities of the device and any user preferences received at block 44. In this way, the user of the CE device 12 may select only content that is pre-filtered to be compatible with the capabilities of the device.

When the server is the management server 32, the action at block 46 is to download to the CE device a list, tailored for the capabilities of the device, of content servers that may be accessed by the device. Also, while the list format is tailored for the CE device, it may happen that some content servers 34 in the IPTV system might not contain any content suitable for the particular CE device model number, and in that case the content server list would not include content servers that do not possess content which is suitably formatted for the CE device model number. To this not only are CE device model numbers and capabilities communicated to the servers 32, 34, but the content servers 34 can inform the management server 32 of the various formats for which it has content so that the management server can decide to include or omit particular content servers from content server lists tailored for CE device model numbers.

Additionally, if desired along with the tailored list the server may prompt newly introduced IPTV CE devices with the existing IPTV services so that user may download content on the list dynamically without complicated configuration input or setup in the server or the target device. The server also May apply the device profiles to filter and prompt new content with the preference playlist to download to multiple devices.

The prompt might simply ask, "do you want content not shown on the list? Answering yes can entail an additional service charge."

Decision diamond 48 indicates that responsive to a request from the CE device for additional content that is not on the content list but that a content server 34 may be able to reformat for the particular capabilities of the CE device, a list of such reformattable content is provided at block 50. If any of the additional content is selected from the reformattable content list by the CE device at decision diamond 52 the selected content is reformatted for the capabilities of the model number associated with the CE device at block 54 and then downloaded to the CE device. The server may send a bill to the owner of the CE device or to the manufacturer for any downloaded content from the reformattable content list.

From block 54 or from negative tests at decision diamonds 48, 52 the logic move s to block 56 to send a report to the manufacturer of the CE device 12. The report indicates which list(s) were downloaded to the CE device, including the original content list from a content server and subsequent reformattable content lists. As indicated above, the report can further include an indication of any content that was reformatted and downloaded per the user's request. The report may be used for remuneration, e.g., the CE device manufacturer may be paid a bonus by the entity owning the reporting server based on the report. For example, a relatively low bonus might be paid from the server owner to the device manufacturer for the downloading of a content list from a content server while a higher bonus may be paid from the server owner to the device manufacturer for the downloading of a piece of content from the original content list that had been tailored for the CE device capabilities. Yet a higher bonus may be paid from the server owner to the device manufacturer for the downloading of a piece of content from the reformattable content list, to reflect the fact that the server owner might have charged the owner of the CE device for the reformatting service. The owner of the CE device 12 may be ascertained from the manufacturer using the serial number of the CE device 12, which the CE device 12 may provide to the management server 32 at registration time, for example. Or, the CE device 12 may be required to register ownership billing information during a registration process in accordance with principles known in the art.

Block 58 in FIG. 4 illustrates that the user of the CE device 12 may upload to the server discussed in relation to FIG. 3 user preferences for, e.g., preferred content formats for devices that support more than a single format. As but one example, a CE device implemented by a TV may support standard definition and high definition TV, and the user may upload a preference for content in high definition.

At block 60, the CE device receives from its input device a selection for Internet TV. This causes the logic to move to block 62 to automatically upload the device model number (and in some embodiments the serial number as well) to the server with which communication is established pursuant to an Internet TV selection, typically the management server 32 for the purpose of obtaining the content server list, which is received at block 64. Content selected from content lists and reformattable content lists provided by content servers 34 is then played on the CE device.

Thus, a server may classify audio video and digital photographic content with CE device players and their respective formats in a database of the server. The manufacturer of the CE device causes the device to automatically upload the device profile with its capabilities for playing audio video and digital photographic content, in the example above, by simply providing the model number of the CE device, which the server can correlate to capabilities using information provided by the manufacturer as described above. The server filters its content for particular model capabilities before it downloads a content playlist to the target device which has registered its own profile on the server database site. The server may also convert or reformat certain content for a requesting device with proper playlist downloading on demand. It may be further appreciated that present principles provide a mechanism to connect the manufacturer of the CE device with various IPTV content servers to support a streaming on demand business model.

While the particular CONTENT LIST TAILORING FOR CAPABILITY OF IPTV DEVICE is herein shown and described in detail, it is to be understood that the subject matter which is encompassed by the present invention is limited only by the claims.

What is claimed is:

1. Method comprising:
   using an Internet server including a processor and a tangible non-transitory computer readable storage medium, receiving a list of consumer electronic (CE) device model numbers from a manufacturer of CE devices, the model numbers being correlated with respective device capabilities;
   at the server, classifying available content it hosts by model number, such that the server correlates its content to one or more model numbers by matching characteristics of each piece of content with the capabilities of each model number;
   receiving from a CE device its model number;
   responsive to the model number, downloading the CE device a tailored list that is tailored for the capabilities of the model number of the CE device;
   responsive to a request from the CE device for additional content that is not on the tailored list but that the server is capable of reformatting for the capabilities of the CE device, providing a list of such reformattable content to the CE device; and
   sending a report to the manufacturer of the CE device indicating which list(s) were downloaded to the CE device, including an original content list from a content server and subsequent reformattable content lists.

2. The method of claim 1, wherein the model numbers are of CE devices expected by the manufacturer to participate in a closed Internet Protocol TV (IPTV) system, the IPTV system being closed in that the IPTV system allows participating devices to obtain from a management server a list of a limited number of content servers from which to retrieve Internet-sourced TV content, with the content servers in turn providing content lists that are limited to pre-approved programming.

3. The method of claim 2, wherein the server is a management server downloading to the CE device, responsive to the model number, a list of content servers from which content may be obtained, the list of content servers being tailored for the capabilities of the CE device.

4. The method of claim 3, wherein at least a first content server in the IPTV system cannot provide content matching the capabilities of the CE device, and the list of content servers returned by the management server to the CE device does not include a link to the first content server but includes links to other content servers in the IPTV system which contain content matching the capabilities of the CE device.

5. The method of claim 1, comprising receiving at the server from the CE device user preferences, such that a particular model of CE device supporting two display formats permits a user to designate which format he prefers so that the server can download the preferred format.

6. The method of claim 1, wherein the server is a management server providing to CE devices a list of content servers from which content may be downloaded, the management server makes multiple copies of the content server list in respective differing formats so that a content server list can be provided to each of the model numbers which matches the capabilities of that model number.

7. The method of claim 1, wherein the server is a content server, the content server returning to the CE device over the Internet a content list showing only content matching the capabilities of the CE device such that a user of the CE device is able to select only content that is pre-filtered to be compatible with the capabilities of the CE device.

8. The method of claim 7, wherein along with the content list the content server prompts the CE device that additional content not on the list is available for reformatting and provisioning to the CE device, the content server, responsive to a request from the CE device for a list of reformattable content, returning to the CE device the list of reformattable content from which a user can select a piece of content for reformatting and provisioning by the content server.

9. The method of claim 8, wherein the report is used for remuneration, wherein a relatively low bonus is paid for the downloading of a content list from a content server while a higher bonus is paid for the downloading of a piece of content from the content list.

10. The method of claim 9, wherein a bonus different from the relatively low bonus and higher bonus is paid for the downloading of a piece of content from the list of reformattable content list.

11. IPTV content server comprising:
processor communicating with the Internet and accessing a tangible non-transitory computer readable storage medium;
the processor executing logic including:
classifying available content hosted by the server by CE device model numbers, the model numbers being correlated with respective device capabilities, such that the server correlates its content to one or more model numbers by matching characteristics of each piece of content with the capabilities of each model number; receiving from a CE device its model number;
responsive to the model number, downloading the CE device a content list that contains only multimedia content for play on the CE device that matches the capabilities of the CE device;
sending a report to a manufacturer of the CE device indicating which list(s) were downloaded to the CE device;
responsive to a request from the CE device for additional content that is not on the tailored list but that the server is capable of reformatting for the capabilities of the CE device, providing a list of such reformattable content to the CE device.

12. The server of claim 11, wherein the model numbers are of CE devices expected by a manufacturer to participate in a closed IPTV system, the IPTV system being closed in that the IPTV system allows participating devices to obtain from a management server a list of a limited number of content servers from which to retrieve Internet-sourced TV content, with the content servers in turn providing content lists that are limited to pre-approved programming.

13. The server of claim 11, wherein the logic further comprises receiving from the CE device user preferences, such that a particular model of CE device supporting two display formats permits a user to designate which format he prefers so that the server downloads the preferred format.

14. The server of claim 11, wherein the content server returns to the CE device over the Internet a content list showing only content matching the capabilities of the CE device such that a user of the CE device is able to select only content that is pre-filtered to be compatible with the capabilities of the CE device.

15. The server of claim 14, wherein along with the content list the content server prompts the CE device that additional content not on the list is available for reformatting and provisioning to the CE device, the content server, responsive to a request from the CE device for a list of reformattable content, returning to the CE device the list of reformattable content from which a user can select a piece of content for reformatting and provisioning by the content server.

16. The server of claim 15, wherein the report is used for remuneration, wherein a relatively low bonus is paid for the downloading of a content list from a content server while a higher bonus is paid for the downloading of a piece of content from the content list.

17. The server of claim 16, wherein a bonus different from the relatively low bonus and higher bonus is paid for the downloading of a piece of content from the list of reformattable content list.

* * * * *